Feb. 14, 1956
E. E. SHULTZ
2,734,258
METHOD OF ASSEMBLING PRESSURE LOADED
TYPE, INTERMESHING GEAR PUMPS
Filed Oct. 7, 1950
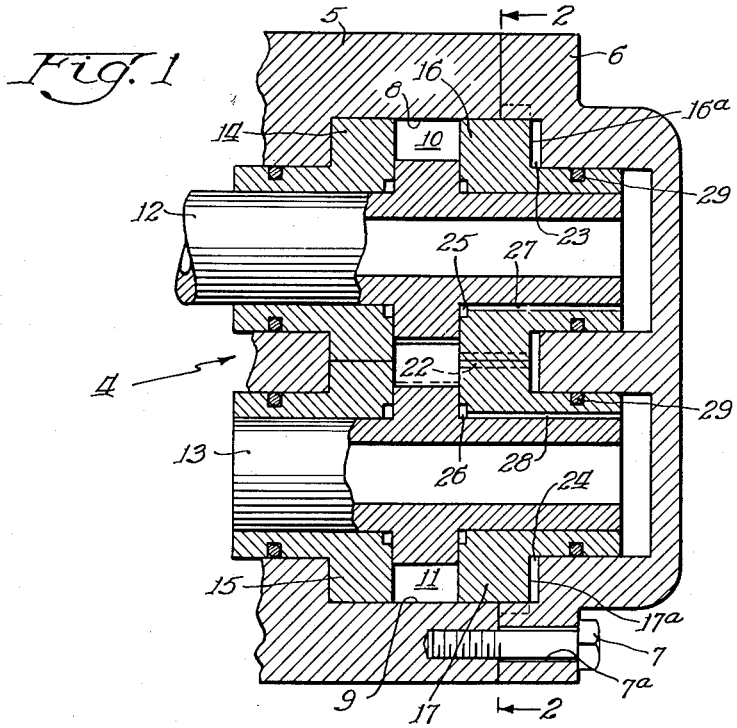
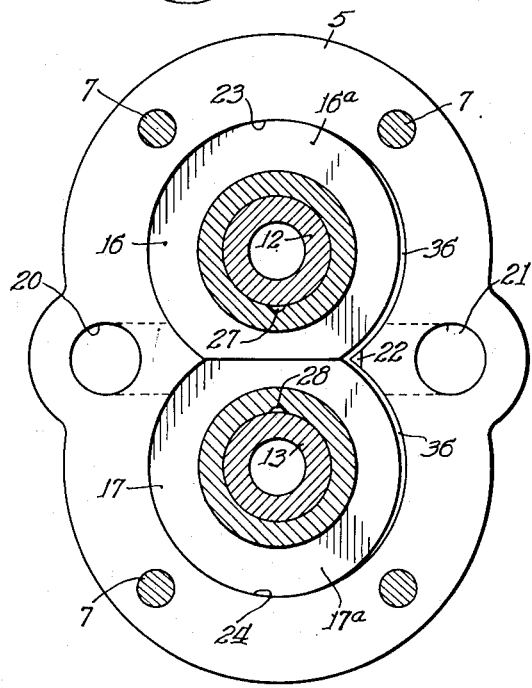
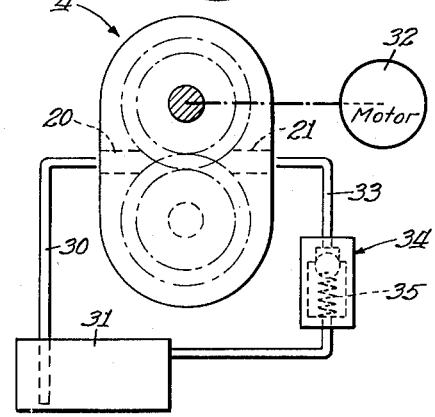
Inventor:
Emmett E. Shultz

United States Patent Office 2,734,258
Patented Feb. 14, 1956

2,734,258

METHOD OF ASSEMBLING PRESSURE LOADED TYPE, INTERMESHING GEAR PUMPS

Emmett E. Shultz, Bedford, Ohio, assignor to Borg-Warner Corporation, Chicago, Ill., a corporation of Illinois Application October 7, 1950, Serial No. 188,946

3 Claims. (Cl. 29—156.4)

This invention relates to a method of assembling pressure loaded type, intermeshing gear pumps.

In a pressure loaded, intermeshing gear type pump having one set of axially movable, pressure loadable bushings, a part of the output or discharge pressure of the pump is applied to the rear or motive surfaces of the axially adjustable bushings to urge these bushings into sealing engagement with their associated gears. As disclosed in U. S. Patent No. 2,420,622 to Roth et al., by carefully selecting the relative areas of the forward surfaces of the bushings and of the motive surfaces of the bushings, it is possible to control within very close limits the actual sealing pressure provided. In practice, this requires a somewhat higher effective pressure in the direction of seal than in the direction tending to open the seal.

Because the pressure loadable bushings must be made movable, a certain minimum clearance must be provided between the sides of the bushings and the adjacent sides of the chambers or bores in the pump housing in which the bushings are received. In practice, this clearance is actually very slight but it has been found that since the bushings may move either to one side or to the other of the chamber during assembly, occasionally a pump will be made in which the clearance of the bushings adjacent the inlet side of the pump is large enough, because of the corresponding reduction in clearance adjacent the discharge side of the pump, which is maintained during the operation of the pump by the shifted alignment of the housing cover section as assembled, to provide a substantial leakage path to inlet pressure. This, of course, reduces proportionately the efficiency of the pump.

An object of the present invention is to provide a new and improved method of assembling a pressure loaded type, intermeshing gear pump.

A further object of the present invention is to provide a new and improved pressure loaded type, intermeshing gear pump.

In accordance with this invention, a pressure loaded gear pump may be assembled in the usual manner, the fixed or immovable bushings being inserted in the body portion of the housing, the intermeshing gears inserted in position, the movable or pressure loadable bushings positioned on the gear journals and the cover section of the housing assembled in place and bolted in position. However, the bolts are not tightened completely. The pump is then placed on a test stand and driven while connected to a source of fluid. While the pump is delivering pressure, the pump cover is completely tightened, the bushings being shifted toward the inlet side to the maximum extent as a result of the pressure developed on the discharge side of the pump.

Other objects and advantages of the present invention will be apparent from the following detailed description thereof taken in conjunction with the drawings wherein:

Fig. 1 is a fragmentary, axial, sectional view of a pressure loadable type, intermeshing gear pump constructed in accordance with the method of this invention;

Fig. 2 is a transverse, sectional view taken substantially along the line 2—2 of Fig. 1; and Fig. 3 is a diagrammatic showing of a test arrangement suitable for use in accordance with this invention.

Referring now to the drawings and particularly to Fig. 1 thereof, a pump 4 generally similar to that shown in the aforementioned Roth et al. patent is illustrated comprising a sectional housing having a main body portion 5 and a right closure member or cover member 6. These sections are normally bolted together as by the bolts 7 and cooperate to define therewithin a pair of parallel axis, intersecting bores or pumping gear chambers 8 and 9 which are arranged to receive in complementary relationship intermeshing pumping gears 10 and 11, respectively. In the embodiment illustrated, the pumping gears have integrally formed therewith hollow journal shafts 12 and 13, respectively, and the left portions of the journal shafts 12 and 13 are received in conventional flanged bushings 14 and 15 mounted in the left portions of the pumping gear chambers 8 and 9. The right portions of the gear journals are received, respectively, in axially adjustable, pressure loadable flanged bushings 16 and 17 mounted in the right side of the pumping gear chamber.

In the embodiment illustrated, the upper pumping gear 10 is the driving gear and is rotated in a clockwise direction, as viewed in Fig. 2. In accordance with conventional pump design practice, the journal shaft of the upper gear may, therefore, be extended to the left, as viewed in Fig. 1, and coupled to a suitable power source. Low pressure liquid is introduced into the pump housing at inlet 20 formed in the left side of the pump housing, as viewed in Fig. 2, and high pressure liquid is discharged from the pump housing through outlet 21 formed in the right side of the housing, the inlet and outlet ports communicating with the inlet and discharge areas of the intermeshing pumping gears. The pressure loadable bushings are normally fitted into the bores with sufficient clearance to permit slight axial movement of the bushing with respect to the bores to establish the desired, pressure loaded seal during operation of the pump.

In the operation of a pump of this type, discharge pressure generated by the intermeshing gears may be communicated from the outlet or discharge side thereof to the annular, pressure loading areas at the back of the bushing, designated 16a and 17a in the drawings, through an axially extending passage 22 formed between the peripheries of the flanged portions of the bushings on the charge side of the pump at the point of convergence of the flanged portions of the bushings. Areas 16a and 17a cooperate with the adjacent walls of the housing bores 8 and 9 and the peripheries of the barrel portions of the bushings 16 and 17 to define annular pressure loading chambers 23 and 24, respectively. The passage 22 extends from the discharge side of the gears to the right, as viewed in Fig. 1, to the intercommunicating portions of the pressure loading chambers 23 and 24 at their point of juncture. Control of the sealing force with which the axially movable bushings 16 and 17 engage the adjacent gear side faces in response to pressure applied to the loading or motive surfaces 16a and 17a is provided by relief recesses 25 and 26 formed in the forward surfaces of the bushings 16 and 17, respectively, radially inwardly of the roots of the gear teeth and vented to a zone of relatively low pressure through axially extending passages 27 and 28.

Escape of pressure rearwardly from the pressure loading surfaces is substantially prevented by means of an O-ring seal 29 disposed about the periphery of the rear or barrel portion of each bushing in a suitable annular groove formed in the periphery of the bushing or in the adjacent bore wall. Pressure leaking past the O-ring seal may be vented to inlet pressure or to a zone of intermediate pressure in accordance with conventional pressure loaded pump practice as set forth in the above-referenced Roth et al. patent.

Since it is necessary in order to permit the slight axial movement required of the bushings in order to establish a seal, to fit the bushings with some clearance in the bushing receiving chambers the bushings may actually be assembled in such manner that more clearance is provided adjacent the inlet side of the pump than adjacent the discharge side of the pump, that is to say that the axially movable bushings may be slightly off-centered with respect to the axis of the bushing receiving chambers and located somewhat nearer the discharge port than the inlet port. Thus, for example, the bushings might be assembled so as to have metal to metal contact with the discharge side so that despite the generation of pressure on the discharge side of the pump, which would otherwise move the bushings toward the inlet side of the pump, the bushings are held transversely immovable by the cover and a leakage path exists adjacent the inlet side which seriously affects the pumping efficiency of the pump. Since, in the operation of the pump, the pressure applied to the pressure loading chambers 23 and 24 is substantially equivalent to discharge pressure, the leakage path provided by the excessive clearance occurring when the bushings are positioned nearer to the discharge port than to the inlet port may be sufficient to materially reduce the efficiency of the pump.

It has been found in accordance with the present invention that this undesirable condition may be substantially eliminated by establishing the location of the bushings prior to final assembly of the pump in such manner that the clearance adjacent the inlet side of the pump is held to a minimum, and by providing means for maintaining this established relation after final assembly of the pump.

More particularly, in the assembly of the pump in accordance with the present invention, the bushings 14 and 15 are placed in the body housing section 5, the pumping gears 10 and 11 are then placed in position with their left journal sections, as viewed in Fig. 1, received within the tubular portions of the bushings 14 and 15. Then the axially movable, pressure loadable bushings 16 and 17 are assembled in position on the pumping gears 10 and 11 with their left sides in contact with the right side faces of the pumping gears. Finally, the cover 6 is assembled in position and the bolts 7 tightened somewhat but not completely. It will be understood also that unless the cover is capable of moving, then the bushings cannot move either since their barrel portions are supported in the cover.

Thereafter the pump 4 is placed on a test stand such as the arrangement shown in Fig. 3. The inlet 20 of the pump is connected through a line 30 to a sump 31 containing a suitable quantity of hydraulic fluid. The journal shaft of the upper pumping gear 10 is connected to a power source such as the electric motor indicated at 32 to drive the gear in clockwise direction as in Fig. 2 and outlet 21 of the pump is connected to the sump by line 33 through a relief valve 34 or other suitable means for providing a load for the pump. Spring 35 of relief valve 34 is selected to permit the valve to open at a predetermined pressure value sufficiently high to simulate normal operating conditions of the pump.

The pump is then driven by the motor 32 and since the cover section 6 is loosely assembled on the body section 5, the bushings 16 and 17 will shift toward the inlet side of the pump in response to development of discharge pressure on the discharge side of the pump adjacent the outlet 21. This discharge pressure is exerted particularly against the right sides, as viewed in Fig. 2, of the flanged portions of these bushings and is effective to shift these bushings toward the inlet side so that a slight crescent shaped gap, designated at 36 in Fig. 2, is provided between the right sides of the flanged portions of each of the bushings 16 and 17 and the adjacent housing wall. As a result of this shifting, the flanged portions of these bushings on their left sides fit very closely against the housing wall adjacent the inlet of the pump. The slight gaps 36 are not sufficiently extended to produce a leakage path to the inlet side but are confined to the high pressure area of the pump and consequently do not affect the efficiency of operation of the pump. On the other hand the consequent reduction or substantial elimination of the gaps on the inlet side of the pump materially contributes to the efficient operation of the pump.

It will be evident that the movement of the bushings to the left, as viewed in Fig. 2, will cause a consequent shifting of the cover section in the same direction. Thereafter, the bolts 7 are tightened to maintain the cover in its shifted position and thereby to maintain the bushings in their shifted position during use.

It will be understood that in the usual and heretofore practiced method of assembly, because the cover was fixed with respect to the housing and the bushings were fitted in the cover chamber portions very closely, the bushings were not free to move laterally sufficiently to establish the desired location.

It will be apparent from the foregoing that in the event it becomes necessary to disassemble the pump after operation in the field, it is then necessary to repeat the foregoing assembly operation step by step in order to insure proper positioning of the bushings and cover.

In accordance with this invention, it has also been found desirable in some cases to enlarge the apertures 7a in the cover 6 through which the bolts 7 extend to permit the cover to shift with the bushings. Heretofore it has been the general practice to make these apertures 7a fit rather closely the sides of the bolts 7.

In practice it has been found that employing this invention materially reduces the number of rejects for failure to provide the required pumping efficiency and also permits considerably wider tolerances in the fitting of the bushings in the pump. Heretofore a bushing which was more than a slight amount smaller than the bore in which it was to be located had to be rejected because of the reduction in pumping efficiency that could result. The present invention, by establishing a minimum clearance in the area where leakage can be a factor, that is, the area adjacent the inlet or low pressure side of the pump, permits substantially greater latitude in the use of undersized bushings without loss in efficiency.

Where herein the various parts of this invention have been referred to as being located in a right or left position, or an upper or lower position, it will be understood that this is done solely for the purpose of facilitating description and that such references relate only to the relative positions of the parts as shown in the accompanying drawings.

What is claimed is:

1. In the assembly of a pressure loaded type, intermeshing gear pump having at least one set of pressure loadable bushings adapted to move axially to engage the gear side faces in sealing relation, the steps of loosening the bolts holding the cover section of the pump housing against the body section sufficiently to permit relative movement therebetween and to permit movement of the bushings towards the inlet side of the pump, operating the pump under sufficient load to develop pressure in the discharge side thereof whereby the bushings are shifted toward the inlet side of the pump and cause consequent relative movement between the housing and the cover section thus defining a seal between the pump housing and the bushings to prevent leakage back to inlet, and thereafter locking the cover section in position on the housing by tightening the supporting bolts.

2. The method of assembling a pressure loaded type, intermeshing gear pump of the type comprising a pump housing having a body section and a cover section, a pair of intermeshing pumping gears rotatably supported in said housing, one set of axially movable, pressure loadable bushings supporting the pumping gears on one side and adapted to engage the pumping gear side faces in sealing relation, said bushings being supported in said cover section and said cover section being secured to said body section by bolts which comprises the steps of assembling the several parts comprising the pump in the pump housing, tightening the bolts holding the cover section of the housing in position on the body section sufficiently only to prevent substantial leakage while permitting movement of the cover section relatively to the body section and permitting relative movement of the bushings with respect to the body section, connecting the pump to a source of hydraulic fluid at its inlet side and connecting the discharge side of the pump to a suitable load whereby upon operation of the pump discharge pressure is built up in the discharge side of the pump, operating the pump to build up discharge pressure in the discharge side of the pump and thereby to shift the movable bushings and the cover in a direction normal to the axis of rotation of the pumping gears and toward the inlet side to define a seal between said bushings and said pump housing which will substantially reduce the leakage from the discharge side of the pump back to the inlet side, and thereafter tightening the bolts holding the cover in position to maintain the shifted position of the cover and the bushings.

3. The method of assembling a pressure loaded type, intermeshing gear pump of the type comprising a pump housing having a body section and a cover section, a pair of intermeshing pumping gears rotatably supported in said housing, one set of axially movable, pressure loadable bushings supporting the pumping gears on one side and adapted to engage the pumping gear side faces in sealing relation, said bushings being supported in said cover section and said cover section being secured to said body section by bolts which comprise the steps of assembling the pumping gears and the bushings in said pump housing, tightening the bolts holding the cover section in position on the body section sufficiently to prevent substantial leakage while permitting movement of the cover section relatively to the body section, connecting the pump to a source of hydraulic fluid at its inlet side and connecting the discharge side of the pump to a suitable load, operating the pump so that discharge pressure is built up on the discharge side of the pump and said axially movable bushings are subjected to discharge pressure, whereby to shift said axially movable bushings toward said pumping gears as well as shift said bushings and said cover section toward the inlet side to define with the pump housing on one side a seal which prevents discharge pressure from leaking back to inlet and defines on the other side of the bushings with the pump housing a crescent shaped opening allowing discharge pressure to be communicated therethrough from the discharge side of the pump, and thereafter tightening the bolts holding the cover and the bushings in position to maintain the shifted position of the cover and the bushings toward inlet side but allows axial movement of the bushings.

References Cited in the file of this patent

UNITED STATES PATENTS

| | | |
|---|---|---|
| 1,249,527 | Simpson | Dec. 11, 1917 |
| 1,584,207 | Bell | May 11, 1926 |
| 1,692,473 | Smith | Nov. 20, 1928 |
| 1,722,616 | Williams | July 30, 1929 |
| 1,938,203 | Witherell | Dec. 5, 1933 |
| 2,118,317 | Mader | May 24, 1938 |
| 2,245,759 | Chrisman | June 17, 1941 |
| 2,420,622 | Roth et al. | May 13, 1947 |
| 2,491,677 | McCulloch | Dec. 20, 1949 |
| 2,491,678 | McCulloch | Dec. 20, 1949 |
| 2,492,935 | McCulloch | Dec. 27, 1949 |
| 2,505,197 | McCulloch | Apr. 25, 1950 |